United States Patent [19]

Simonton et al.

[11] Patent Number: 4,678,729
[45] Date of Patent: Jul. 7, 1987

[54] SEPARATOR BASKET PREFORMS FOR PRIMARY CELLS AND METHODS OF FORMING AND INSERTING SAME

[75] Inventors: R. D. Simonton, Fremont; John D. Cattano, Castalia; Robert K. Mason, Gibsonburg, all of Ohio

[73] Assignee: Fremont Special Machine Co., Inc., Fremont, Ohio

[21] Appl. No.: 871,867

[22] Filed: Jun. 9, 1986

Related U.S. Application Data

[63] Continuation-in-part of Ser. No. 707,887, Mar. 4, 1985, Pat. No. 4,618,546.

[51] Int. Cl.$^4$ .................. H01M 2/18; B65H 20/00
[52] U.S. Cl. .................................. 429/129; 429/139; 29/623.1; 156/204; 226/6; 226/52
[58] Field of Search ............... 429/133, 136, 139, 140, 429/129; 29/623.1, 623.2, 623.3, 623.4; 156/145, 196, 200, 204, 205, 209, 308.4; 428/188; 226/2, 6, 52, 62

[56] References Cited

U.S. PATENT DOCUMENTS

| | | | |
|---|---|---|---|
| 2,061,524 | 11/1936 | Storck | 226/6 |
| 2,275,064 | 3/1942 | Moore | 226/6 |
| 3,013,100 | 12/1961 | Mendelsohn et al. | 429/139 |
| 4,410,383 | 10/1983 | Lipari | 429/139 |

FOREIGN PATENT DOCUMENTS 0730237  3/1966  Canada .................. 429/133

*Primary Examiner*—Donald L. Walton
*Attorney, Agent, or Firm*—David H. Wilson

[57] ABSTRACT

A system of forming and manipulating primary cell separator basket preforms produced in strip form and tandem relationship with a dentent associated with each preform, e.g., a transverse slit in the strip for each preform displaced so its edge is outstanding from the generally flat strip. The preforms are fed to forming and insertion equipment by guiding the strip into alignment with a cut-off which is arranged to sever the lead preform and into alignment with a forming and insertion mandrel path of travel, engaging a detent on the strip with a dog and advancing the dog and strip along the path to present the lead preform for cut-off, opening and mandrel insertion. The severed preform is supported and compressed transversely between a support member having a groove to embrace a side portion of the preform and the dog or dog and cut-off blade so that it is opened and restained to receive the forming and insertion mandrel. Further restraint of the preform motion along the mandrel insertion path is provided by a support across that path which is displaced by mandrel advance toward a cell subassembly adapted to receive the separator basket.

24 Claims, 16 Drawing Figures

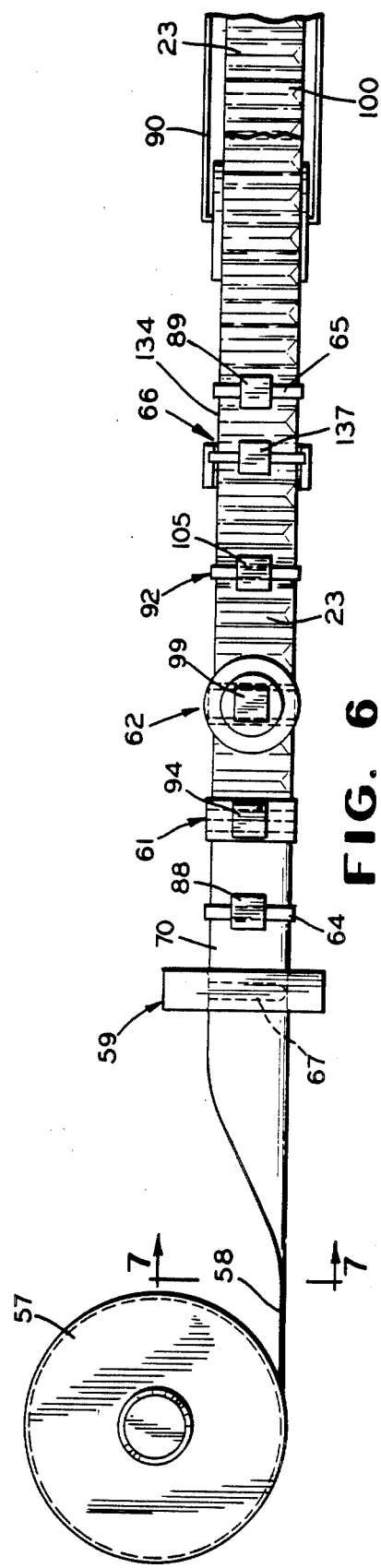
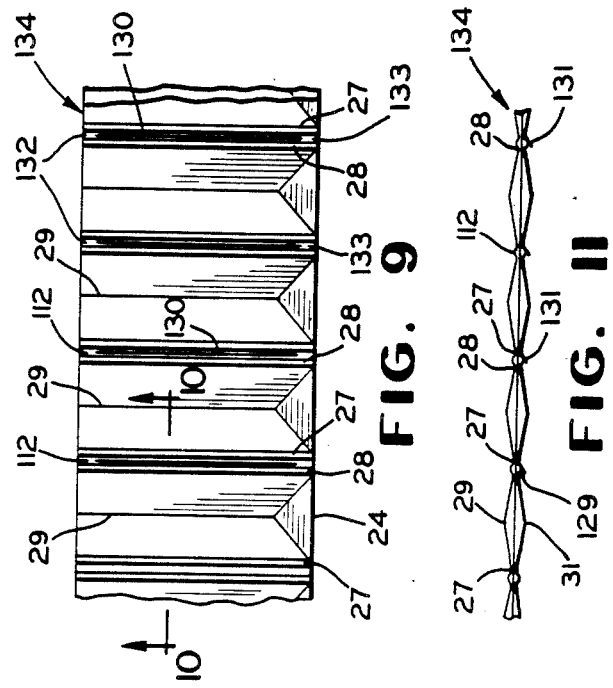
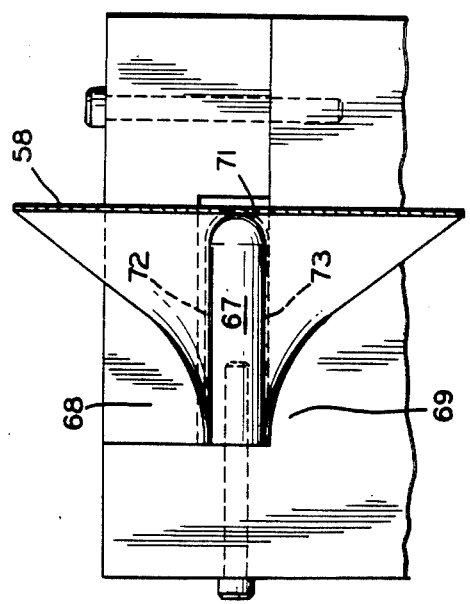

SEPARATOR BASKET PREFORMS FOR PRIMARY CELLS AND METHODS OF FORMING AND INSERTING SAME

This is a continuation in part of U.S. patent application Ser. No. 707,887 now U.S. Pat. No. 4,618,546 entitled Cell Separator Basket and Method of and Apparatus for Forming and Inserting Same filed Mar. 4, 1985, in the names of Robert D. Simonton, John D. Cattano and Robert K. Mason.

This invention relates to cell separator baskets as employed in primary cells and to the method of and apparatus for forming such baskets and inserting them in a partially fabricated cell.

Primary cells having cylindrical shaped elements have separator membranes of tubular shape for physically separating the anode and cathode while permitting ionic flow therethrough. Such separators are fabricated from materials which resist chemical attack by the compositions within the cell, are mechanically stable for battery fabrication, and can be economically fabricated into suitable structures. Typically, thin sheets of ionically permeable, thermoplastic material such as polyethylene and polypropylene are employed and they may be combined with fibrous material or laminated with fibrous felted sheets of absorbent material for the retention of electrolyte particularly on the surface adjacent the cell cathode.

Separator structures in the form of wound tubes of sheet material have been formed with suitable bonds at the overlapping junction of the sheet. Fabrication and handling of such tubes, particularly in the smaller size cells has been a difficult and expensive aspect of cell manufacture.

Another form of separator basket has been formed by two U shaped strips of separator material positioned in quadrature around their axes between their arms such that the width of the strips of material overlap when inserted in a cell structure to enclose an electrode of the cell to insure separation of the anode from the cathode and elements in conductive contact with the anode and cathode. Such a separator basket construction is shown in Canadian Pat. No. 730,237 to Carmichael and Daley issued Mar. 15, 1966 wherein the basket is formed by advancing man against a first blank of separator sheet material and into a die to form an outer wall with diametrically opposed longitudinal seams then rotating the die and outer wall ninety degrees and advancing a mandrel against a second blank of separator sheet material and into the die containing the outer wall structure to form an inner wall structure having opposed longitudinal seams in quadrature with the seams of the outer wall. It is suggested that the inner and outer cupped shaped separators can be formed in place within the container of a galvanic cell.

Lipari U.S. Pat. No. 410,383 of Oct. 18, 1983 for "Method for the manufacture of Thermoplastic Tubular Members" discloses a method of and apparatus for fabricating separator membranes for use in alkaline electrochemical cells from two thin sheets of ionically permeable thermoplastic overlaid upon each other as strip stock and impulse heat sealed to each other longitudinally of the strips. A continuous process is disclosed where the strip stock is conveyed along a path through apparatus having two or more welding anvils operating in conjunction with an ultrasonic welding head and spaced apart perpendicular to the path to form continuous spaced apart seams parallel to the conveying direction of the strip. The strip is cut at the seam so that the sheets remain joined on each side of the cut, preferably by simultaneously cutting and welding. The tubes thus formed are cut to any suitable length for further fabrication as cell separators.

The present invention forms closed end tubes or baskets by folding a single strip of separator sheet material longitudinally, bonding the facing surfaces of the folded sides of the strip together transversely of the strip at intervals spaced longitudinal of the strip, and ultimately severing the strip transversely at or adjacent the spaced bonds to provide partially formed separator baskets with a closed bottom at the fold and closed sides along the bond fins formed by the joined overlaying strip sides. Bond spacing for each basket is one half the desired perimeter of the separator basket to be formed and advantageously can be accomplished by a bifurcated welding head having its operating faces and cooperating anvils at the desired spacing longitudinal of the strip and of a length transverse of the strip equal to or exceeding the length of the basket, advantageously the folded strip width.

While separator baskets can be cut from the strip at or adjacent the welding heads, an enhanced handling and forming of the basket is achieved by maintaining the strip with the partially formed baskets integral for feeding to the final forming station for insertion in a cell subassembly. The strip form of separator baskets can be an intermediate product and as such conveniently is wound in a coil or packaged in a magazine for storage, shipment or feeding to the equipment in which the separator baskets are utilized. Alternatively it can be fed in line from its forming mechanism to the apparatus for final forming and insertion of the separator baskets into primary cells.

Improved control of a strip of separator preforms has been achieved by slitting the strip transversely intermediate each preform across a portion thereof to provide detents in the strip which are engageable by a dog for indexed advance of the strip in subsequent operations. A particularly advantageous arrangement includes imparting an offset of the strip portion on one side of each slit from the strip portion on the opposite side of the slit to facilitate the engagement of the dog. Other forms of engageable abutments on the strip can be substituted for the slit such as longitudinal margin cutouts uniformly positioned along the strip relative to the individual separator preforms.

The equipment forming the strip includes means to shear the strip during the formation of separator basket preforms integral with the strip so that the shear cut is transverse to the longitudinal margins of the strip, is less than the width of the strip, and is spaced inwardly from the strip margins to provide links between successive preforms. Where the paired transverse bonds defining the sidwalls of the separator basket are normal to the longitudinal margins of the strip, the sheared slits are normal to the strip longitudinal margins and between bond pairs closing the sidewalls of the separator basket. Slit registration between bands of face-to-face bonded sidewall material is accomplished in line with the formation of the bonds.

The subsequent manipulation of the strip of separator basket preforms is facilitated by indexing the preforms from the detents in the strip, the transverse slit in the example, so that the preforms are accurately positioned for severance from the strip for further forming as by opening their walls at the unjoined side which was the longitudinal margins of the ribbon material by inserting a cylindrical forming mandrel into the open side and by advance of the mandrel bearing the preform into a forming die and/or a cell subassembly cavity. The leading preform of a strip is advanced to a station in which it is severed from the strip and maintained for the insertion of the mandrel and from which it can be carried automatically by the mandrel to the cell subassembly cavity. Sequencing controls automatically repeat the strip advance, lead preform opening, lead preform severance, mandrel insertion and preform deposit in the cell subassembly cavity.

The preform strip is drawn through a strip guide and its lead preform is driven by a dog carried on a slide block and engageable with the detent slit next following the lead preform. The dog is extended to engage the strip behind the detent slit of the lead preform, it is advanced along the path established by the strip guide to slide it over the strip surface and into abutting engagement with the edge of the slit trailing the lead preform. Further advance of the dog and its supporting slide block advances the lead preform ahead of the dog and draws the strip behind the lead preform through the guides. At the extreme of advance travel of the dog, the leading edge of the lead preform, a fin of material made up of the bonded overlaying sidewalls, is introduced into a supporting slot of a receiver element and the lead preform is compressed between the receiver element and the dog to cause the preform sidewalls to bow outward thereby facilitating the insertion of a forming mandrel into the preform. A shear severs the lead preform from the strip at the advance position of the dog by cutting the bridging links to the strip. The shear and dog can be maintained in their cut-off and advanced positions respectively to support the severed lead preform in its opened state during mandrel insertion. A retainer can be provided to provide a support surface normal to the general plane of the strip as defined by the strip guide and normal to the insertion path of the mandrel at the longitudinal margin of the strip opposite the insertion region of the preform as defined by the strip guide whereby the lead preform is retained against the insertion force of the mandrel. This retainer is displaced by the continued advance of the mandrel beyond the mandel insertion station where the mandrel travels through that station to a cell subassembly cavity for receiving the separator.

In accordance with the above features it is an object of this invention to improve primary cell separators, their methods of fabrication, and the means of installing them in cell structures.

Other objects are to increase the speed of manufacture, simplify the handling, and reduce the ultimate cost of primary cell separators and the cells in which they are employed.

The above and additional features and objects of the present invention will be appreciated more fully from the following detailed description when read with reference to the accompanying drawings in which.

Figure 4:
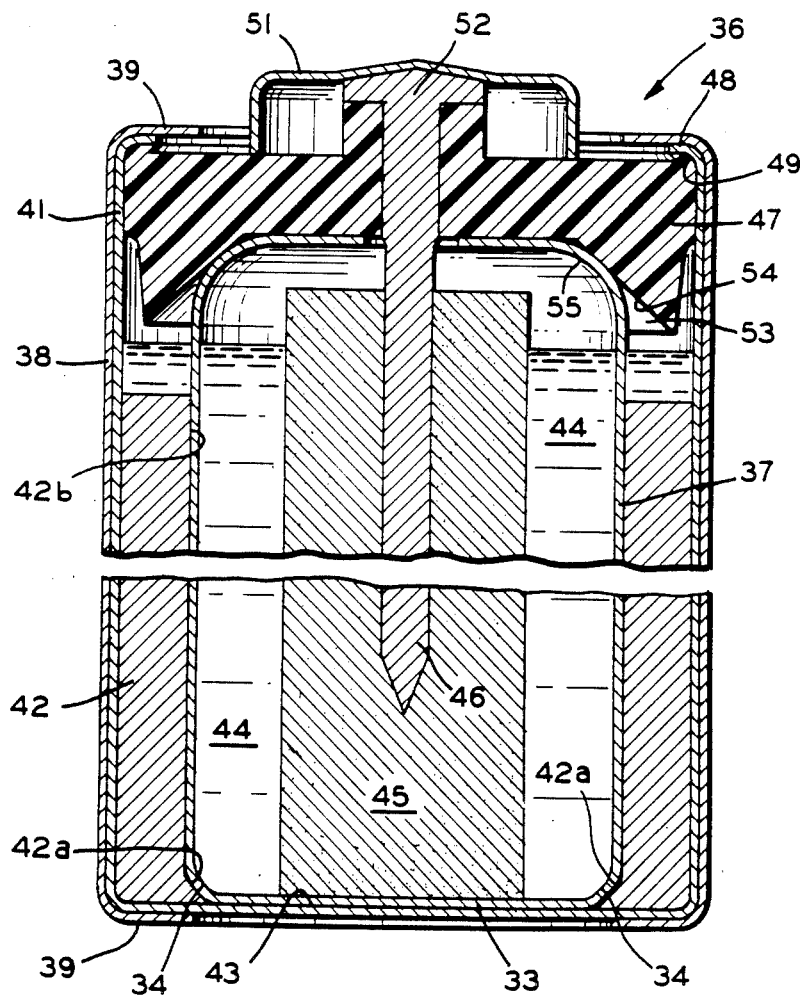
FIG. 4 is a sectioned elevational view of a primary cell of the type in which the separator basket of this invention is utilized.
Figure 5:
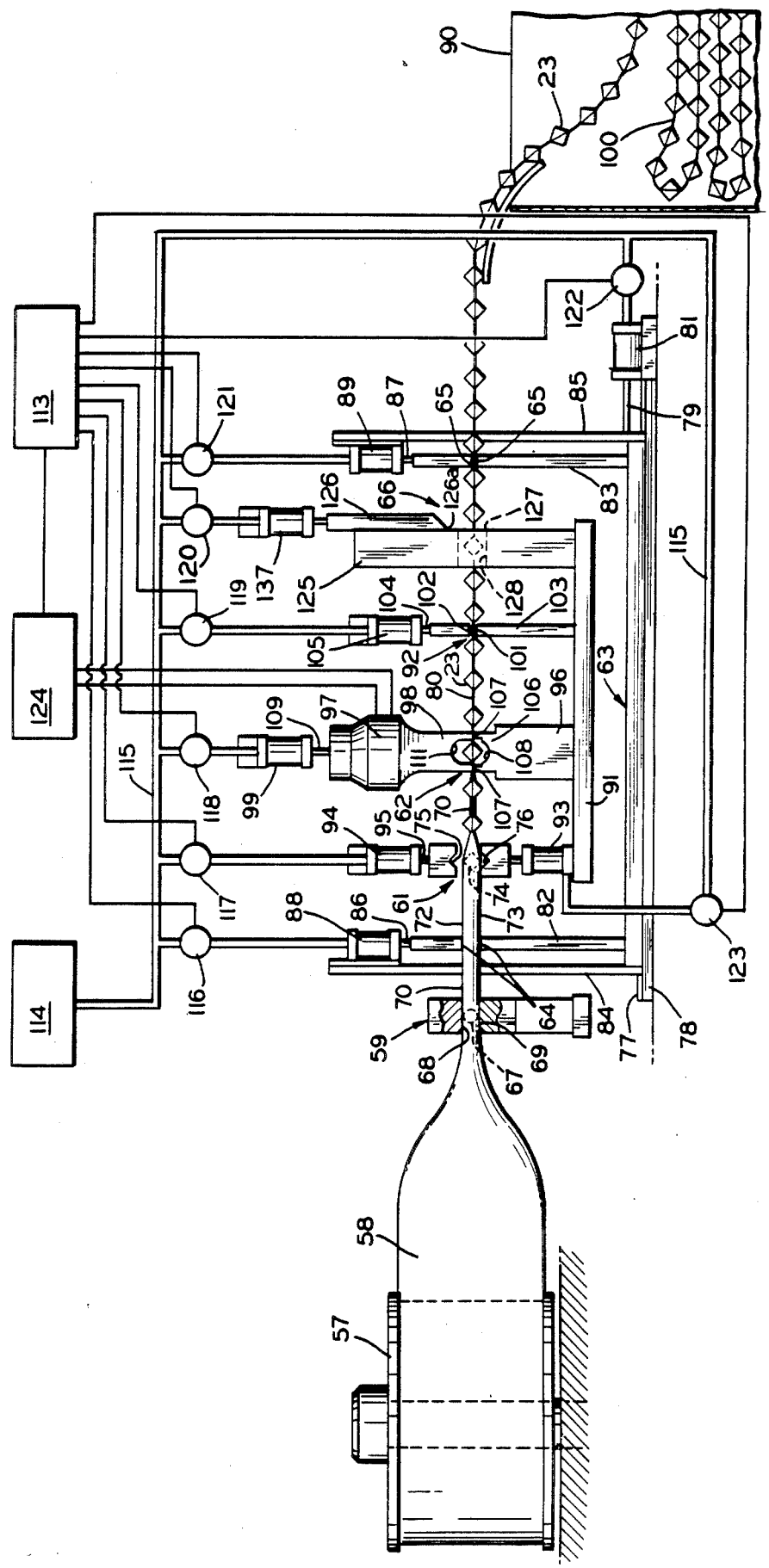
Figure 8:
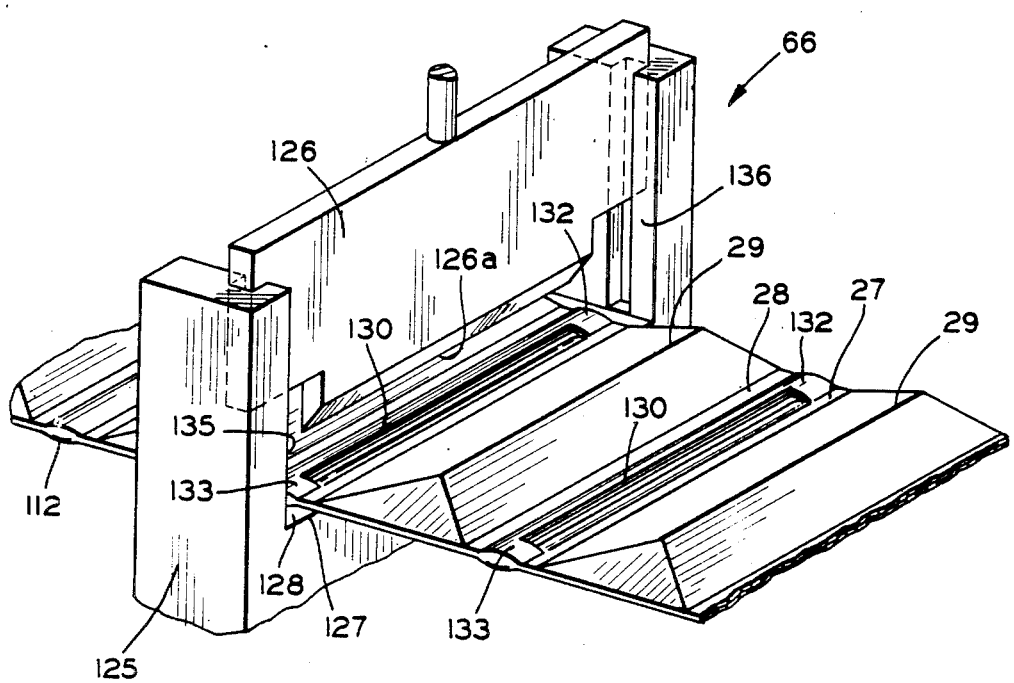
Figure 10:
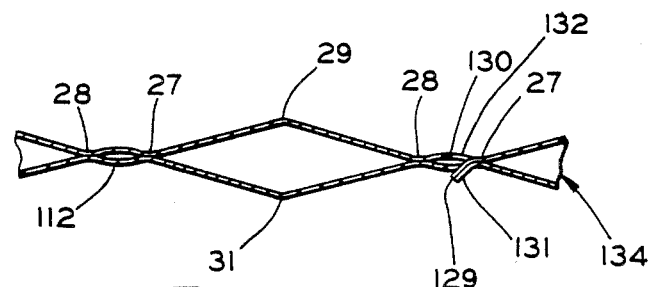
Figure 16:
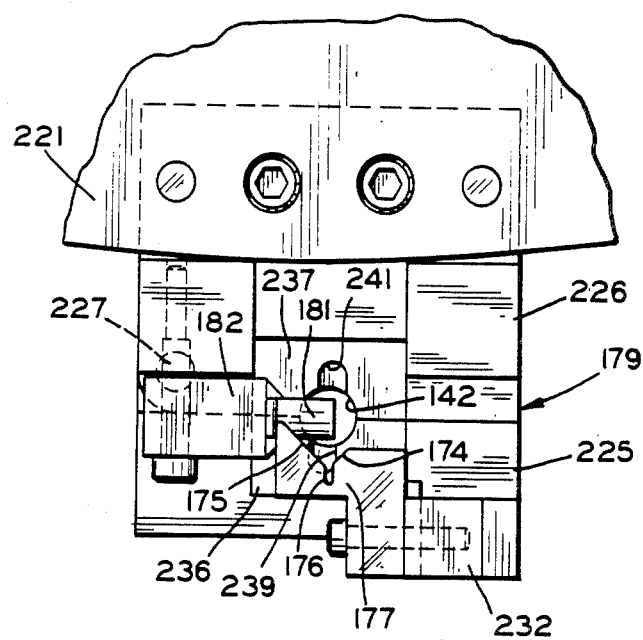
Figure 12:
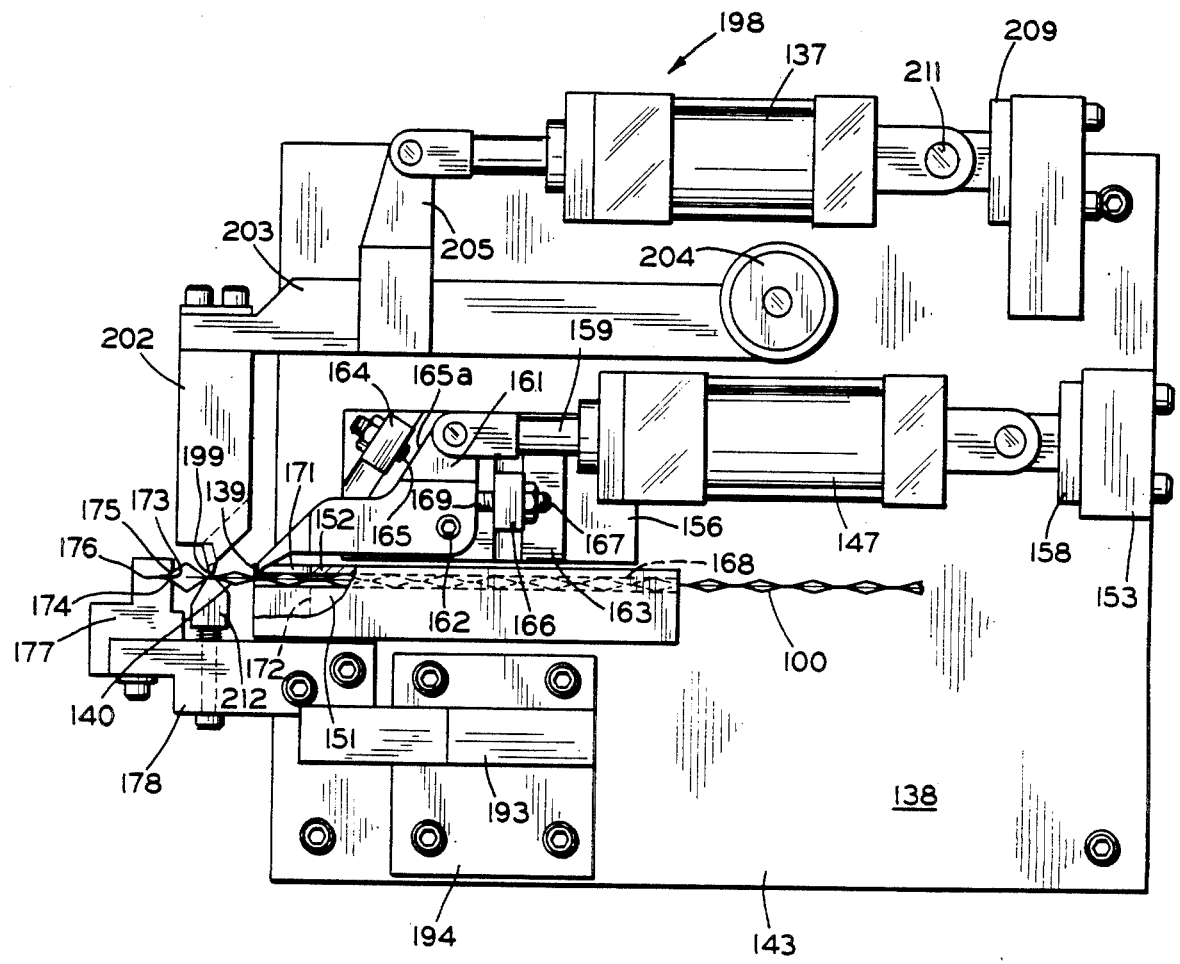
Figure 13:
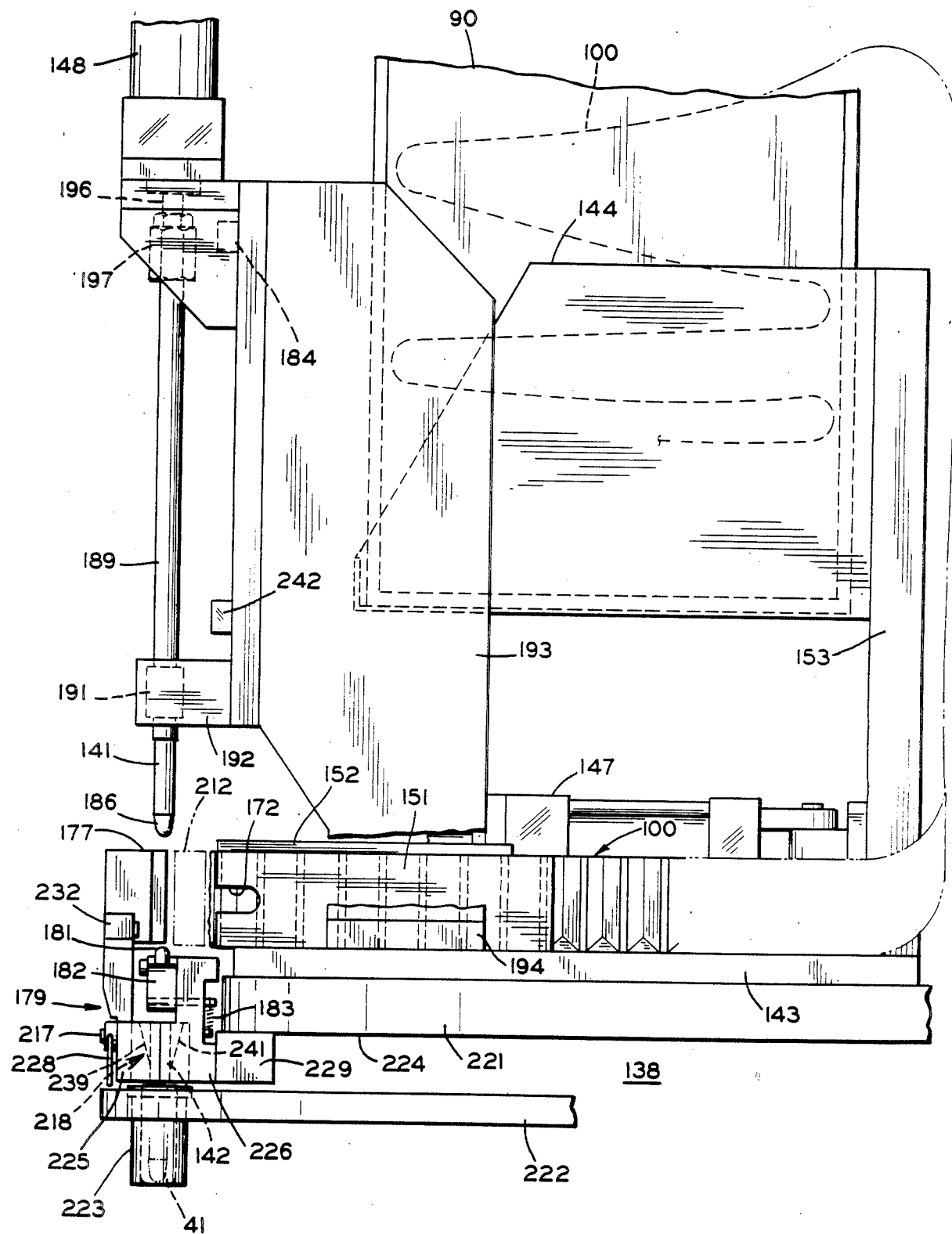
Figure 14:
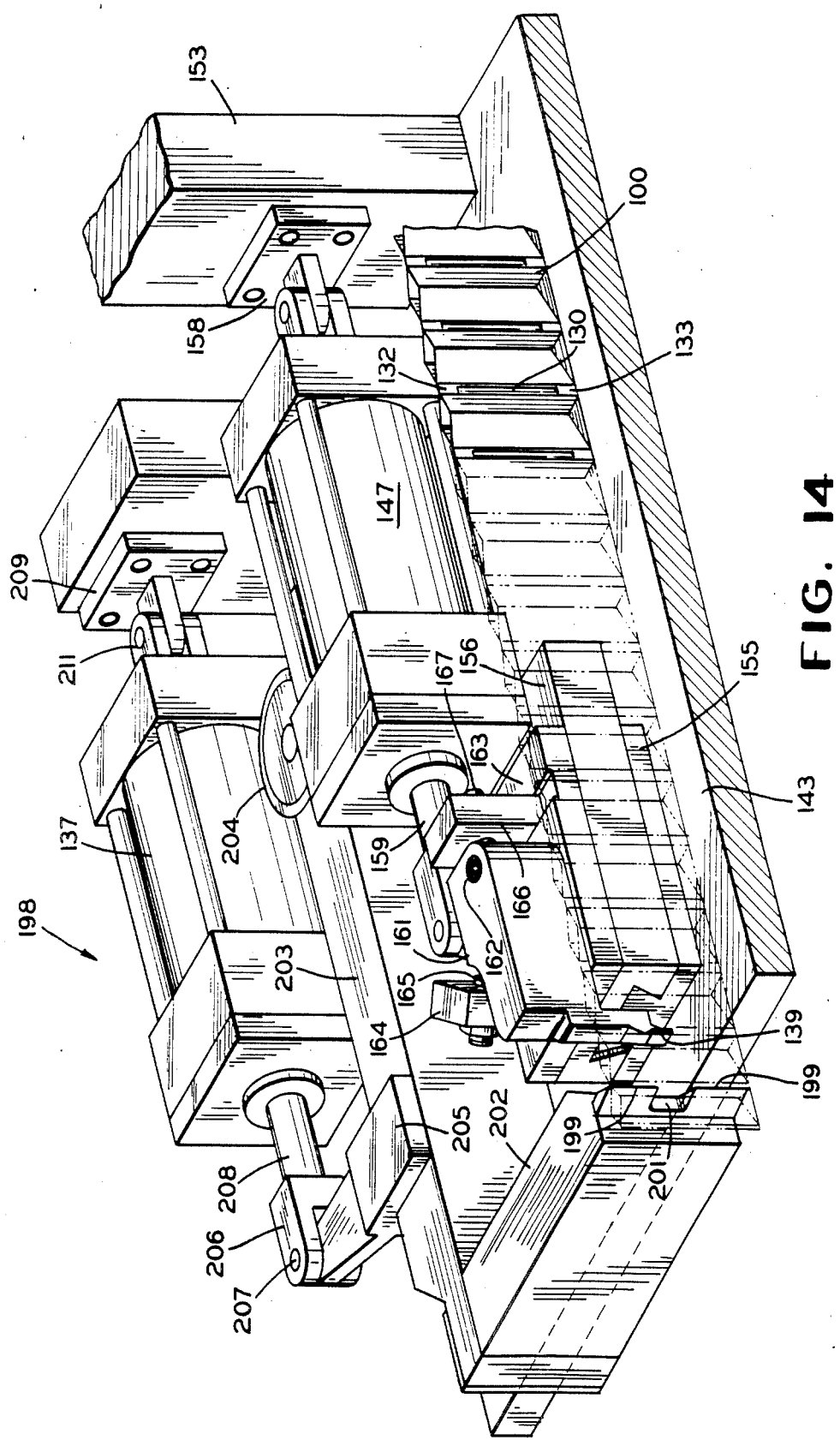
Figure 15:
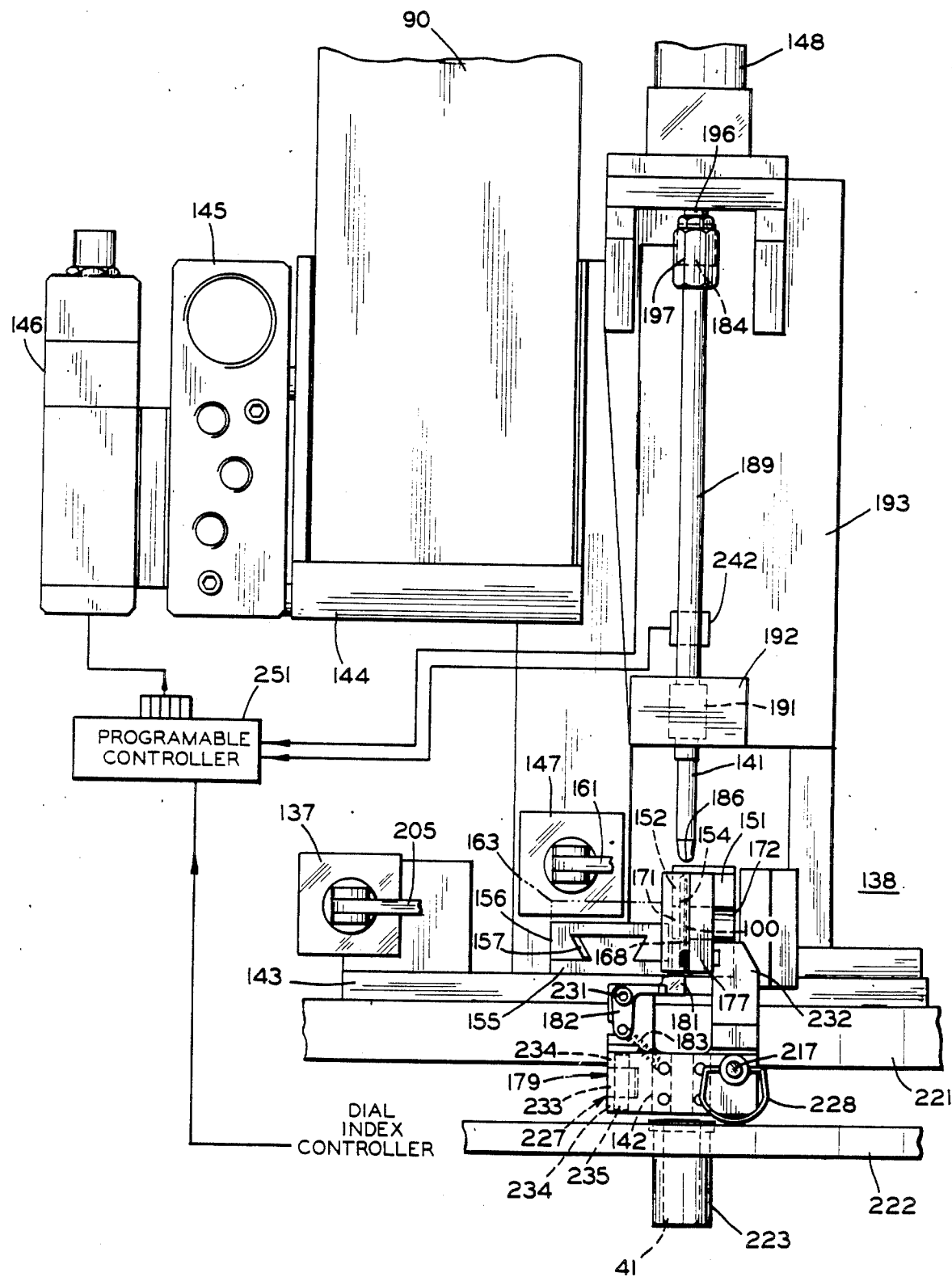

FIG. 5 is a schematic elevational view of one separator basket forming apparatus for feeding a strip of sheet material from which baskets are formed, folding, preform creasing, bohding and partially slitting the strip of resultant separator basket preforms between adjacent preforms according to this invention; including a schematic electrical control system for a schematically shown pneumatic drive system;

FIG. 6 is a plan view of the apparatus of FIG. 5 showing the folding of the separator sheet strip and forming of a strip of preforms having transverse slits between adjacent preforms;

FIG. 7 is a sectioned view of the strip folding station taken at line 7—7 of FIG. 6;

FIG. 8 is a perspective view of a portion of the apparatus of FIG. 6 in the region of the shear station which produces the strip detents or feeder engageable abutments between each preform;

FIG. 9 is an enlarged plan view of a fragment of the creased, bonded and transversely slit strip of separator basket preforms as it passes the shear station and is fed to the strip magazine of FIGS. 5 and 6;

FIG. 10 is an enlarged sectional view of the strip preceeding the shear and a portion following the shear to illustrate the strip feed detents or feeder engageable abutments between each preform;

FIG. 11 is a side view of the strip of FIG. 9;

FIG. 12 is a schematic plan view of portions of the apparatus for further forming of a separator basket which includes means for advancing the strip of preforms and opening the lead basket preform of the strip to facilitate the insertion of the separator basket in a cathode half cell of the primary cell of FIG. 4 with the strip magazine, insertion mechanism, and drive control means omitted for purposes of illustration and a simplified preform opening mechanism shown;

FIG. 13 is a side elevational view of the apparatus of FIG. 12 with portions broken away or omitted, showing portions of the means to guide and to advance the strip of preforms, to open the leading preform on the strip, to insert a forming mandrel into a preform for advance into a cell structure, and to retain the severed preform during mandrel insertion, together with the tooling dial on which the separator insertion apparatus is mounted and the indexing dial which advances partially fabricated cells to the insertion apparatus, with the preform advance dog mechanism and cut-off mechanism omitted for clarity of illustration of the remaining elements and with the preform retention and opening mechanism of FIGS. 13, 15 and 16 different from that shown in FIG. 12 and of a form which is preferred in some applications;

FIG. 14 is a perspective view of the separator feed path, the feed dog extension and retraction and advance and retreat mechanism and the preform cut off mechanism as shown in FIG. 12;

FIG. 15 is an end view from the left hand end of the apparatus of FIG. 13, with the feed dog extension and retraction and advance and retreat mechanism as well as the preform cut off mechanism omitted for purposes of clarity and showing schematic controls for the pneumatic control of the actuating cylinders of the inserter; and FIG. 16 is a plan view of the preform opening and retaining mechanism shown in FIGS. 13 and 15.

Figures 1, 2, 3:
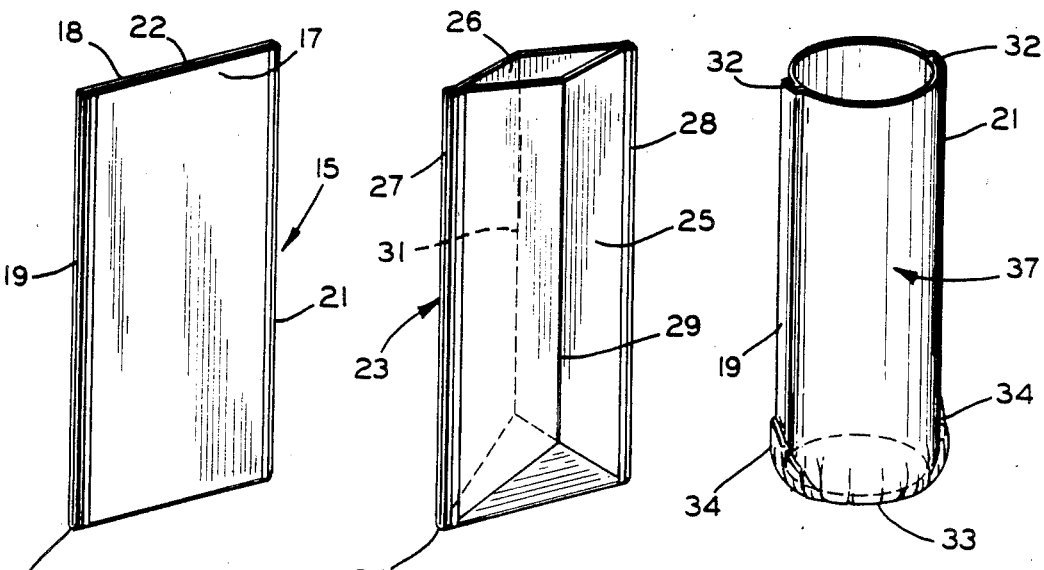
FIG. 1 is a perspective view of a folded and bonded separator basket preform before it is opened according to one aspect of this invention.
FIG. 2 is a perspective view of another form of a folded and bonded separator basket preform which is partially preformed to open its end according to another aspect of this invention.
FIG. 3 is a perspective view of a formed separator basket as derived from the folded and bonded units of FIGS. 1 or 2; illustrating the form of the basket within a primary cell.

One form of a separator basket preform 15 made up of a sheet of separator material folded upon itself at fold 16 as a front wall 17 and rear wall 18 is shown in FIG. 1. The overlaid edges of walls 17 and 18 extending from fold 16 are bonded in face to face relationship as by ultrasonically welding to form bond fins 19 and 21 while the sides of the overlaid walls 17 and 18 opposite fold 16 are left unbonded at 22 so that they can be opened to receive elements of the cell.

Another form of separator basket preform 23 is shown in FIG. 2. It includes a bottom fold 24 of the sheet from which it is formed and front and rear walls 25 and 26 bonded along their sides 27 and 28 as in FIG. 1. However the front and rear walls are spaced to facilitate the forming of the basket. Spacing of the front and rear walls 25 and 26 between their bonded sides is achieved by creasing the folded material along the central region of each wall to form crown 29 and 31.

In the completed form the separator basket is of generally circular cross section and is adapted to be fitted within a right circular cylindrical cavity as will be described. The bond fins 19 and 21 or 27 and 28 are folded against the adjacent basket wall as at 32 in FIG. 3 and the bottom 33 of the basket is formed generally to the constraining cavity by crimping the excess corner material 34 at the fold region.

A typical primary cell 36 to which the separator basket 37 formed as shown in FIG. 3 and mounted in accordance with the method and employing the apparatus of this invention is shown in FIG. 4. It comprises an outer insulator tube 38 having ends 39 formed over a can 41 which contains the cell elements. The can 41 and its elements are concentric and of right circular cylindrical form in the example. A cathode 42 of a suitable composition, manganese dioxide, graphite, potassium hydroxide and binder in a compressed powder form, for an exemplary alkaline cell, partially fills the can 41 in its lower portions as a hollow cylindrical body having chamfered and inwardly directed bottom edges 42a to complement the crimped contour 34 of the bottom of the basket. Separator basket 37 is fitted within the hollow cathode with its closed end 33 abutting the inner face of can end 43 and its outer sides contiguous with the inner surface 42b of cathode 42. Electrolyte 44, potassium hydroxide in the example, fills the space between the inner surface of the separator basket 37 and an anode cake 45 in which is embedded a collector or anode conductor 46.

Can 41 is closed at its upper end by a top 47 of insulating material which is resistant to the electrolyte and is sealed with the can walls by crimping the upper lip 48 of the can over a suitably radiused upper shoulder 49 of the top. Anode conductor 46 is in electrical communication with a conductive cap 51, advantageously by welding the cap to the headed portion 52 of anode conductor 46. Conductor 46 is secured in the cap 47 in sealed relationship therewith to prevent leakage of electrolyte. A frusto conical cavity 53 in the underside of top 47 has its inclined walls 54 engaged with the open end wall portion 55 of separator basket 37 and deflects those end portions inwardly from their right circular cylindrical form to a convergence around the central anode conductor 46 when the top is applied to the assembly.

In an exemplary embodiment of an alkaline cell such as a size AA cell the can 41 is of steel, the cathode 42 is a mixture of manganese dioxide, graphite, potassium hydroxide and a binder compressed to a hollow right circular cylinder, the separator is an ionically permeable thermoplastic sheet of polypropylene felted fibers, the electrolyte 44 is potassium hydroxide, the anode case 45 is powdered zinc mixed with mercury, potassium hydroxide and a gelling material, the anode conductor 46 is brass, the cap 51 is nickel plated steel, and the top closure 47 is nylon, typically duPont Zytell 101. It is to be appreciated that separator baskets of the general form disclosed can be made of other ionically permeable thermoplastic sheet materials and can be utilized in other forms and geometries of primary cells.

Separator baskets according to this invention can be formed from a coiled strip or ribbon 58 of sheet stock, which has a width twice the desired height of the basket, folded upon itself longitudinally along the longitudinal center of the ribbon. Such folded stock can be preformed and face-to-face bonded in spaced bands extending transverse of its length to form partially preformed baskets 23 as shown in FIG. 2 by means of apparatus as schematically illustrated in FIGS. 5, 6 and 7.

A reel 57 for coiled separator sheet ribbon 58 is shown with its axis of rotation vertical in FIG. 5. Sheet ribbon 58 is drawn from reel 57 to a fold station 59, a creasing station 61, a bonding station 62 and a shear station 66 by a reciprocating gripper slide 63 having sets of gripper jaws 64 between the fold station 59 and the creasing station 61 and gripper jaws 65 beyond the shear station 66. The partially preformed separator baskets in the illustrated system are maintained in a strip, partially severed transverse of the strip between adjacent preforms 23 at a shear station 66, and are advanced to a magazine 90 in which they are accumulated as a flaked strip stack 100.

Ribbon 58 is carried over a folding mandrel 67 positioned between and spaced at least the ribbon material thickness from opposed folding blocks 68 and 69 having surfaces which engage the ribbon which are normal to the plane of the unfolded ribbon 58. As shown in detail in FIG. 7, ribbon 58 is confined by the folding station since the lower block 69 supports folding mandrel 67 as a cantilever from its upstanding arm and upper block 68 extends along the upper surface of the mandrel and across its end. In order to facilitate threading of the ribbon through the folding station, block 68 is removably secured to block 69 as by a screw. The longitudinal center of the ribbon is carried over the radiused end 71 of the folding mandrel so that upper 72 and lower 73 runs of ribbon 58 are wrapped over the mandrel and translated to a parallel relationship by the folding blocks 68 and 69. Advantageously the folded ribbon 70 is oriented with its upper and lower runs 72 and 73 parallel to the working planes of the subsequent ribbon processing stations. Gripper jaws 64 grip the longitudinally folded upper and lower runs 72 and 73 of ribbon 70 in superposed relation and with jaws 65 are reciprocated to the right as viewed in FIGS. 5 and 6 to advance an increment of folded ribbon 70 to a creaser mandrel 74 upon which upper and lower creaser jaws 75 and 76 close to crease the upper and lower runs 72 and 73. Mandrel 74 can be square with its cross-sectional diagonals parallel with and normal to the folded ribbon 70. Jaws 64, 65, 75 and 76 can be driven by any suitable means such as pneumatic cylinders controlled by solenoid actuated pneumatic valves sequenced with reciprocation of gripper slide 63 which can be similarly driven. As creaser jaws 75 and 76 close on mandrel 74 a crowned crease 29 and 31 is formed in each of the upper and lower runs 72 and 73 extending transverse of the length of those runs and outwardly from each other from the open side of the ribbon to a point approaching the fold 24.

The gripper slide 63 is shown schematically in FIG. 5 and only the gripper jaws and actuators are shown in Fig. 6. The slide 63 moves on rail 77 on bed 78 and is driven along those rails by piston rod 79 from pneumatic cylinder 81. Slide 63 carries lower jaws 64 and 65 on stanchions 82 and 83 and the actuators for upper jaws 64 and 65 on stanchions 84 and 85. Upper jaws 64 and 65 are carried on piston rods 86 and 87 extending from cylinders 88 and 89 secured to stanchions 84 annd 85.

A stationary base 91 supports creaser station 61, bonding station 62, holddown 92 and shear station 66. The creaser station support from base 91 is shown as lower jaw actuating cylinder 93. Upper jaw actuating cylinder 94 and the creaser mandrel 74 may be supported on a stanchion (not shown) from base 91 to maintain the alignment of jaw 75 on the rod 95 from cylinder 94 and the mandrel 74 with lower jaw 76. Creaser jaws are opened and closed on mandrel 76 by actuating cylinders 93 and 94 as will be described. Similarly, bonding station lower anvil is mounted on a stanchion 96 from base 91 and the horn 97 and upper anvil 98 are mounted for movement toward and away from the lower anvil by cylinder 99 mounted on a stanchion (not shown) from base 91. A holddown station has a stationary lower jaw 101 and a movable upper jaw 102 which hold the bonded strip 80 during release and retraction of gripper jaws 64 and 65. Lower jaw 101 is mounted on base 91 by stanchion 103. Upper jaw 102 is on piston rod 104 extending from cylinder 105 supported from base 91 by a stanchion (not shown).

The holddown is located along the separator strip path with references to the bonding station a given number of advance increments from that bonding station so that its jaws close upon the adjacent bond regions between adjacent separator basket bodies. This avoids crushing the crown regions 29 and 31 of those bodies. In similar fashion the position of the cutting edges of shear station 66 are located along the separator strip path with reference to the bonding station a given number of advance increments from the bonding station to register the shear cut between the leading bond of the following preform and the trailing bond of the lead preform.

The crowned creased areas of folded ribbon 70 are advanced to the bonding station 62 which is spaced from the creasing station 61 a multiple of advance increments so that the crowns 29 and 31 are centered in the bonding station. The bonding station is illustrated as an ultrasonic welder although a heated welder or an adhesive bonder might also be utilized. It includes an anvil having working surfaces 107 extending across ribbon 70 and longitudinally spaced along the ribbon the distance desired to define essentially one half the perimeter of the separator basket to be formed and defining the spacing of the bonds 27 and 28 between the upper and lower runs 72 and 73 of the ribbon 70. A cut out region 108 is provided between surfaces 107 to receive the crown 31 of the crease in lower run 73 without removing that crown during the bonding operation. The welding or bonding head upper anvil 98 is positioned above and in cooperative relation with anvil 106 and is arranged for vertical reciprocal motion by piston rod 109 from cylinder 99 coupled to transducer 97 to carry the welding faces of upper anvil 98 into compressed bonding engagement with the superimposed runs 72 and 73 as the creasing jaws are closed. Upper anvil 98 is bifurcated to support spaced faces and provide therebetween a relieved region 111 to accommodate the crown 29 of the upper run 72.

As the bonded strip of preforms 80 exits the bonding station 62 it is passed through shear station 66 which is positioned along the strip path a incremental number of preform advance lengths from the bonding station so that shearing action is applied between the leading and trailing bond fins 28 and 27 of adjacent separator preforms. The shear station includes a stationary shear block 125 which can be mounted on base 91 (by means not shown) and a moveable blade 126 which provides a shearing action at cutting edge 126a with a lower edge 127 of aperture 128 through which the strip of preforms is passed. Moveable blade 126 can be supported from a stanchion from base 91 and its relationship to the strip is shown in the perspective view of the strip of FIG. 8.

The shearing action upon the strip cuts across only a portion of the strip to form an edge 129 functioning as a tooth or engageable abutment of a ratchet which, as will be described, is engageable by a dog for advancing the strip. Advantageously one side of the cut edge is displaced out of the surface of the strip as in the raised region 131 of FIG. 10 to enhance the tooth action. At least one bridging portion 132 of the preform strip is retained between adjacent preforms to maintain strip integrity through subsequent handling of the strip. In the embodiment shown in FIGS. 8, 9, 10 and 11 bridging elements 133 and 132 are retained at the top open end of the preforms, the upper longitudinal margin of the strip, and the bottom folded closed end, the lower longitudinal margin of the strip, respectively, and thus along the longitudinal side edges of the strip and the sheared slit 130 forming edge 129 is in the regions between those preform ends. Other forms of drive abutments are contemplated including punched holes in the strip between the preform side of adjacent preforms, or teeth, or cutouts in the strip margin. By virtue of the motion of the moveable blade 126 past the fixed edge 127 the material bordering the slit 130 on the leading side is displaced downward out of the general plane of the strip to form the raised region 131 and enhance the exposure of edge 129 for engagement in the subsequent feeding operation. This slit form is achieved by guiding the strip by means of side walls 135 and 136 of aperture 128 in shear block 125 to position the strip relative to the moveable blade travel path so that the blade engages and shears a region of the strip intermediate the longitudinal side edges while leaving an unsheared portion beyond the ends of the blade and at those edges. Typically, unsheared bridges 132 and 133 are of a width of about three thirty seconds to one eighth inch.

The bonded and sheared strip 134 appears as shown in FIGS. 8, 9, 10 and 11 as a series of joined partially preformed separator baskets 23 of the form shown in FIG. 2. It will be noted that the basket side bonds 27 and 28 are individual in the strip. That is, there is a short intermediate length 112 of the bonded strip 80 between the side bonds 27 and 28 of adjacent baskets. It is to be appreciated that the intermediate length 112 can be adjusted by the advance increment determined by the stroke of the gripper slide 63 and that such adjustment can be incorporated in the slide drive. A normal advance increment is the width of the separator preform, thus one half the perimeter of the separator basket plus twice the width of the bonded fins plus the spacing between adjacent preforms. The preform width is the overall width of the bifurcated welder head at its working faces plus the spacing between adjacent preforms as is the advance increment. The shear station 66 is positioned along the path of strip 80 at a location which enables the edge or tooth 131 to be sheared out of the surface of the intermediate length 112 between the trailing side bond 27 of the leading basket preform on the strip and the leading side bond 28 of the next succeeding preform.

The strip 134 with a series of partially preformed baskets can be festooned or flaked into a magazine box 90.

Sequencing in the basket preformer of FIGS. 5, 6 and 7 is accomplished by conventional electronic controls such as a programmable controller 113 issuing signals to solenoids actuating drive cylinder control valves which maybe pneumatically driven. A supply of pressurized air 114 is conveyed by manifold 115 to the respective pneumatic valves 116 for cylinder 88, 117 for cylinder 94, 118 for cylinder 99, 119 for cylinder 105, 120 for cylinder 137, 121 for cylinder 89, 122 for cylinder 81 and 123 for cylinder 93. Each of the valves has a feed conduit to its respective cylinder which can represent both advance and retraction feeds for the pistons therein. Each of the valves also has a control circuit for signals passed from the sequencer 113 represented by a single line. An initialized condition of the sequenced element finds the gripper slide 63 retracted toward the supply of sheet strip 58 and all of the gripper jaws 64 and 65, creaser jaws 75 and 76, welding head 98, holddown 102, and shear blade 126 retracted.

The gripper jaws 64 and 65 are closed on ribbon 70, which has been longitudinally folded along its longitudinal center line and has been threaded through the fold, creasing and bonding stations and between the gripper jaws, by actuating solenoid valve controlled cylinders 88 and 89. Then the gripper slide is advanced by actuating advance cylinder 81 while jaws 64 and 65 remain closed to advance the folded ribbon 70 one separator basket advance increment. This draws an unfolded sheet strip portion into the fold station 59 to fold it for introduction into the creasing station 61.

Next the upper and lower creasing jaws 75 and 76 are closed upon a folded length of ribbon 70 which has an upper run 72 above and a lower run 73 below creasing anvil 74 to crease the runs over the mandrel. Jaw closure is by advancing actuation of the solenoid valve control of cylinders 94 and 93 in response to signals from sequence control 113. Welding head 81 is advanced by a similar control of cylinder 99 and the ultrasonic driven energy source 124 for its transducer 97 is activated while welding faces of lower anvil 107 and upper anvil 98 engage the lower and upper runs of folded ribbon 70 in welding relationship to form a pair of side welds embracing a creased portion of the ribbon and form separator basket 23.

With the preform strip held stationary and the space between the lead bond 28 and the trail bond 27 of the preceding preform in registry with the shear blade 126, the shear is driven downward past shearing edge 127 by actuation of cylinder 137 through solenoid valve 120. This displaces the edge 129 adjacent trail bond 27 downward to form the depressed region 131. Controller 113 then retracts the blade 126 by valve 120 and the pneumatic drive of cylinder 137. The sheared and bonded strip section 134 to the right of shear station 66 as viewed in FIGS. 5 and 6 is advanced into magazine 90 with bridging edge portions 132 and 133 maintaining strip integrity on each side of the slit 130.

After the completion of bonds at 62 welding energy is terminated to transducer 97 and welding head 98 is retracted to raise it from the bonded areas of the sheet strip 80. The ribbon 70 is also released at the creasing station 61 by the retraction of jaws 75 and 76 through solenoid valve actuation of cylinders 94 and 93. With the formation of creases at 61, bonds at 62, and a slit at 66, the creaser welder and shear free the strip for advance by suitable solenoid valve actuation of the drive cylinder 81. The ribbon and strip is held in its current position by activating holddown 92 through sequencer 113 signal activation of cylinder 105 while the gripper jaws 64 and 65 are retracted from the strip by cylinders 88 and 89 in response to signals from sequencer 113 to disengage the advanced slide 63 from the strip. Gripper slide cylinder 81 is activated by signals from sequencer 113 to retract the slide toward the source of ribbon 58. After being retracted by slide 63 to a position to grasp a new separator basket increment of folded sheet strip 70, the gripper jaws 64 and 65 are closed by cylinders 88 and 89 in response to signals from sequencer 113 to engage the new increment. That new increment and those portions of sheet strip 70 in advance thereof including the creased regions and the bonded regions are all advanced one separator basket increment by the advance of the slide 63 through sequencer activation of gripper slide cylinder 81 while the jaws 64 and 65 remain closed all under control of the sequencer 113.

Thus the sequencer 113 controls the apparatus which causes strip to be advanced, folded, creased, bonded and slit.

Such partially preformed baskets can be manually formed and inserted into primary cell assemblies as by the insertion of a mandrel (not shown) into the basket end which is partially open due to crimping of the major faces of the sheet strip. Where the basket is to be of a right circular cylindrical form, the mandrel can expand the basket to that form where it is a circular cylinder of an outer diameter approaching the internal diameter of the cathode cylinder 42. Also the mandrel with the separator basket thereon can be inserted into a forming tool (not shown) to fold the finned bond regions of the basket wall against the outer wall of the separator basket. Where a cathode cylinder has been formed within a primary cell casing as shown in FIG. 4, the mandrel with the separator basket thereon can also be inserted into the cathode-can assembly so that the nose or lead end of the mandrel over which the closed basket end is fitted forms that basket end to the can bottom.

As shown in FIGS. 5 and 6 the partially preformed separator baskets are maintained in the sheet strip which is accumulated in the magazine box 90.

FIGS. 9, 10 and 11 depict the creased and bonded separator basket preforms in a strip prior to and after slitting. The separator material at region 112 between leading bond fin 28 and trailing bond fin 27 as it appears in these drawings is unslit as it occurs prior to slit station 66. The adjacent bond fin region shows the slit 130 and its displaced portion forming abutment 131 at slit edge 129.

Completion of the forming of the separator baskets preformed as in FIGS. 2, 9, 10 and 11 is accomplished as shown in FIGS. 12 through 16 by spreading the adjacent walls of the basket preform 23, inserting a forming mandrel into the open end of the basket preform, severing the basket preform from the strip, advancing the severed basket preform with the mandrel therein through a forming tool which folds the fin like edge bonds along the basket side, and passing the basket preform with the mandrel therein into a cavity and against an end wall of the cavity to form the end to the cavity configuration. The equipment of FIGS. 12 through 16 performs these forming and insertion steps on the separator baskets of the type shown in FIGS. 2, 9, 10 and 11 as derived from a magazine 90 which may be an open top box of FIGS. 5 and 6.

A strip 134 of separator preforms connected along their margins is fed to an inserter station 138 of a cell assembly system from magazine 90. The magazine is mounted so that the leading end of the strip 134 as it is produced and fed into the magazine remains the leading end upon withdrawal at the inserter station as by removal of its bottomwall and transfer to its opposite end while inverting the magazine in its holder 144 at the inserter 138. Thus the raised trailing edge 129 of each preform is readily engageable by a feed dog 139 arranged to be extended toward the strip to press against its surface and then advanced in the direction of the length of the slip to pick up the trailing edge of the leading preform of the strip and advance that preform. A mandrel 141 is inserted into the leading preform. It is then severed from the strip and the mandrel advanced to carry it through a forming die 142 which shapes it as a right circular cylinder and folds the bond fins along the sides of that cylinder so they can be inserted into a battery cathode cavity positioned along the path of advance of the mandrel beyond the forming die.

As seen in FIGS. 12, 13, 14 and 15 the insertion station 138 has a base 143 which is mounted to align mandrel 141 so that its travel extends to a battery subassembly mounting for subassemblies adapted to receive the separators, this can be a station in which the subassembly is positioned automatically as by an indexing turret or linear advancing indexing chain (not shown) or it can be a station into which subassemblies are loaded manually. Inserter station 138 is a stand alone unit having a separator preform magazine holder 144, a pneumatic drive manifold 145, solenoid controlled valves 146 for the drives, and a feed cylinder 147, a cutoff cylinder 137, and an insertion cylinder 148 all mounted on insertion station base with their associated mechanical elements.

A strip 134 of preforms 23 partially separated by slits 130 intermediate the longitudinal edges of the strip is carried from separator magazine 90, shown as a transparent walled, open top box in FIG. 13 to a guide chute (note shown) which orients strip 134 perpendicular to base 143 with the edge 24 forming the bottom of the preforms 23 resting thereon and the length extending along guide block 151 and guide cover 152 which are aligned with the centerline of the line of travel of insertion mandrel 141. The guide chute and magazine holder 144 are supported from a support column 153 upstanding from the rear edge of base 143. Guide block 151 is secured to base 143 so that its sidewall 154 confines one face of a run of the strip 134 of separator preforms, the other face of which is confined along with the upper edge of the strip by guide cover 152 secured as by a cap screw to guide block 151. Guide cover 152 is a bar of inverted L shaped cross section and with block 151 extends along a plurality, e.g., six or seven, of preforms in the strip. Guide cover 152 imposes a drag on the separator strip 134 by virtue of the spacing of less than the spacing of the strip crowns 29 and 31 between its inner side wall and wall 154 of the guide block. Guide block 151 and guide cover 152 lead the free end of the preform strip into the path of travel of the insertion mandrel 141 and advantageously support all portions of that lead end other than the lead preform 140 and a limited leading portion of the next following preform.

Preform strip 134 is drawn through the passage formed by guide block 151 and guide cover 152 by feed dog 139. Dog 139 is reciprocated along a path generally paralleling the passage on a dove tail slide having a base block 155 secured to base 143 and an upper slide 156 with a gib 157 in the dove tail to impose a limited drag on the motion of slide 156. Slide 156 is driven by pneumatic cylinder 147 secured to base plate 143 through an adjuster 158 so that the location of the effective stroke of piston rod 159 can be adjusted. Rod 159 from cylinder 147 is coupled to bell crank 161 by a suitable clevis and pin. Bell crank 161 carries feed dog 139 on its arm remote from the rod coupling and is pivoted at the junction of its arms on a pin 162 carried by a plate 163 secured to slide 156. Plate 163 carries two stop blocks for the pivotal motion of bell crank 161 so that the crank can be rotated through a limited arc about pin 162 by drive rod 159 to extend and withdraw dog 139 at the initiation of displacement of rod 159. Thus, dog extension stop block 164 carries a stop screw 165 having a lock nut to establish the position in which it is engaged by bell crank extension abutment 165a on the side of the crank arm. A dog withdrawal stop block 166 carries an adjustable stop screw 167 having a lock nut and arranged to abut bell crank 161 at the initiation of retraction motion by feed rod 159.

In operation, with a strip of separator preforms passed into and through guide passage 168 between 152 and 154 and with feed rod 159 fully retracted, bell crank 161 is at its clockwise limit of rotation around pivot pin 162 with retraction abutment 169 abutting retraction stop screw 167 and slide 156 and its top plate 163 at its right hand extreme of travel as viewed in FIG. 12, the solenoid control of the valve 146 controlling the advance air to cylinder 147 is actuated to apply air to the cylinder. The initial advance of rod 159 causes counter clockwise rotation of bell crank 161 since gib 157 imposes sufficient resistance to displacement of slide 156 on its base block 155 to inhibit any slide motion until the crank arm extension abutment 165a engages extension stop screw 165. This rotation of crank 161 extends feed dog 139 downward as viewed in FIG. 12 so that its end extends into passage 168 through a cutout 171 in guide cover 152 and against the preform strip in passage 168. The tip of dog 139 can extend completely across passage 154 if the physical characteristics of the strip so dictate since guide block 151 is also provided with a cutout 172 to accommodate that tip.

Further advance of feed rod 159 drives slide plate 163 and slide 156 to the left as viewed in FIG. 12 so that dog 139 moves along cutouts 171 an 172 and over the surface of preform strip 134 until it engages and is biased into slit 130 and abuts slit side 129 of the lead preform 140. This motion toward mandrel stroke path advances the rear or trailing edge 129 of the slit between the lead preform and the next following preform and thus draws the entire strip 134 of preforms 23 from magazine 90 through passage 168. With the preform strip fed to passage 168 so that edge 129 protrudes toward dog 139, upward as viewed in FIG. 12, the dog readily engages edge 129 and its further advance advances the lead preform a distance determined by the length of the stroke of rod 159. Thus, that stroke limit is adjusted through adjustment of cylinder position by adjuster 158 to center the lead preform of the strip on the centerline of the mandrel 141 in its axial advance from above the separable upper edges of the preform in the general plane of the preform and parallel to its fin side bonds.

Full advance of dog 139 is somewhat longer than the width of a preform so that the tip of the dog is biased against the preform following lead preform 140 and is then slid over its surface until it encounters a pick up edge 129 of the trailing slit 130 of preform 140. Motion is continued until dog and the trailing slit are at the line of severance of the strip bridging links 132 and 133 at the ends of trailing slit 130. Dog 139 is maintained in that advanced position until lead preform 140 is severed from strip 134.

The leading preform on the preform strip is opened and aligned for the entry of mandrel 141 during the terminal portion of its advance by feed dog 139. The leading side bond fin 28 of the leading preform is fed into and forced against the end wall of a pucker block cavity 173 which is in the form of a wide mouth groove parallel to the mandrel line of travel and having opposed walls 174 and 175 which converge to a narrow slot 176 for receiving the thickness of fin 28. As the fin 28 is advanced it is guided by the walls 174 and 175 to their region of convergence and thus to fin receiving slot 176. Slot 176 engages the length of the fin 28 thereby sustaining the separator preform in alignment with the insertion mandrel path of travel. Still further advance of the leading preform to a position in which feed dog 139 is spaced from the bottom of slot 176 a distance of about the sum of the diameter of the fully formed separator and the width of fins 27 and 28, compressively flexes the separator preform sidewalls 25 and 26 to cause the crimps or crowns 29 and 31 to separate outwardly thereby opening the unbonded side 22 to facilitate entry of forming mandrel 141. At this position feed dog 139 is aligned with the line of cut-off for lead preform 140 and it is so maintained until the cut-off blade is advanced to sever bridges 132 and 133. Pucker block 177 containing cavity 173 can be mounted with slot 176 in alignment with strip passage 154 from a bracket 178 on base 143 as shown. in FIG. 12 or on a preform retainer 179 as shown in FIGS. 13, 15 and 16.

Two forms of pucker block mounting have been illustrated. While either form is effective for its intended function, there are circumstances where enhanced control of the severed lead preform during mandrel insertion is achieved with the arrangement shown in FIGS. 13, 15 and 16. A long thin separator basket having a long fin retention slot 176 in its pucker block is retained by friction of the slot walls on the separator bond fin sufficiently so that the mandrel will enter the open end of the separator without forcing it along the length of slot 176 ahead of the mandrel. A short separator basket, particularly a relatively large diameter short basket will not be retained reliability at high operating speeds when the mandrel engages the upper edges of the open upper end of the basket and may be pushed ahead of the mandrel and out of the slot 176 prior to adequate engagement of the mandrel with the interior of the basket walls. Accordingly, for some applications a basket support or retainer is desirable to retard motion of the basket along the path of travel of the mandrel by supporting the basket closed end while it is compressed between the pucker block and the cut-off blade and/or advance dog until the mandrel is well advanced into the basket.

A support for the bottom of the separator preform is provided by preform retainer 179 located beyond and in alignment with the preform strip support surface of inserter station base 143. Thus as the lead preform on the strip is cantilevered beyond the base 143 it is engaged at its bottom in a location generally centered between fins 27 and 28 by a retractable support bar 181 having an arcuate upper surface. Support bar 181 is on a bell crank 182 biased by a tension spring 183 to a position at or slightly below an extension of the plane of the upper surface of base 143 which is supporting the separator strip. Bar 181 is in the line of travel of mandrel 141 with the arc of mandrel tip 186 centered on the arc of support bar 181 upon contact.

As the mandrel advances to the position at which the retained preform is supported by bar 181, the preform, which has at that time been severed from the strip, is held against the mandrel advance by bar 181 and aligned by slit 176 in pucker block 177 so that it will advance past bar 181 by pivoting bell crank 182. The mandrel causes the bell crank 184 to swing aside permitting the mandrel to carry the preform beyond the preform retainer 179.

Lead preform 140 is severed from the preform strip prior to the introduction of mandrel 141 into that preform. Mandrel 141 is carried on an insertion rod 189 mounted for reciprocation transverse of and in the general plane of the generally planar preform strip 134 as it is maintained by the guide. The rod 189 is maintained in a bearing 191 carried on a guide block 192 supported from insertion cylinder support gusset 193 extending to a foot 194 secured to the upper face of base 143. When the slide 156 and feed dog 139 advance is initiated by feed cylinder 147, a timer in the programmable controller which issues control signals to the solenoid valves 146 controlling cylinders 137, 147 and 148 begins to time out. When a first time interval expires, the cut-off is actuated and when a second interval expires the mandrel advance is initiated if it is enabled by the presence of a cathode can subassembly positioned to receive a separator basket.

Cutoff 198 is actuated by cutoff cylinder 137 as best seen in FIGS. 12 and 14. A knife blade 199 is arranged to sever the upper and lower margin briges 132 and 133 between the lead separator 140 and its next adjacent following separator in the strip. Blade 199 has upper and lower portions spaced by a gap 201 which accommodates the feed dog while it is engaged with the separator strip and is in its advanced position. Blade 199 is carried on an arm 202 secured to lever 203 pivoted on pin 204 to travel in an arc parallel to the plane of base plate 143. A drive arm 205 extends from lever 203 on the side opposite blade mounting arm 202 and is coupled by a clevis 206 and pin 207 to piston rod 208 of cutoff cylinder 137. Cylinder 137 is secured to base 143 through an adjustable mount 209 and a clevis and pin coupling 211. The extension of rod 208 drives lever 203 counterclockwise around pin 204 as viewed in FIGS. 12 and 14 to advance knife 199 into a severing relationship with the separator strip bridging portions 132 and 133 without interferring with feed dog 139. A spring biased cutoff anvil 212 cooperates with cutoff blade 199 to sever the lead preform from the strip. Anvil 212 is on the back side of the preform strip 134 relative to the blade 199 and is supported from base 143 by bracket 178 so that the points of severance are in alignment with the slit 130 in the preform strip between the lead preform and the next following preform as defined by the motion of feed dog 139, thus blade 199 and dog 139 are in alignment at their respective maximum advancements.

Mandrel 141 is advanced downward in FIG. 13 by energizing solenoid controlled valve 146 upon time out of the second timer defining an interval from initiation of the feed for the advance of the piston in insertion cylinder 148. Insertion cylinder piston rod 196 extends from the cylinder 148 and through alignment coupling 197 advances insertion rod 189 downward as viewed in FIGS. 13 and 15. Mandrel tip 186 is introduced into the open end of the lead preform 140 and is advanced along the interior of that preform.

In an operating cycle, the home position of the elements is the mandrel 141 in the raised position, the advance dog 139 in its extended position and the cut-off blade 199 closed on anvil 212. For illustration purposes FIGS. 12 and 14 show the dog retracted and withdrawn from strip 134 while the cut-off blade 199 is closed.

A cycle is initiated from the home position by the sensing of a cell can 41 and cathode 42 in the separator receiving position along the line of travel of mandrel 141. Thus, when dial 222 completes its index to locate a cell can in separator receiving position a signal is issued to the programmable controller 251 to enable the timer to control the advance of mandrel 141 by energizing the advance solenoid valve 146 for insertion cylinder 148. As the mandrel reaches its extreme extension, proximity switch 242 is activated to signal the controller 251 that an insertion has occurred. Controller 251 issues signals to solenoid valves 146 causing feed cylinder 147 to retract, cut-off cylinder 137 to retract and insertion cylinder 148 to retract. As the insertion rod 189 reaches its fully retracted position, proximity switch 184 is actuated to signal controller 251 that the apparatus is prepared for a separator basket preform advance.

Controller 251 defines a time interval from the mandrel retraction signal and at the end of that interval the feed dog 139 is advanced by a signal from the controller 251 to dog advance solenoid controlled valve 146 for cylinder 147. Upon completion of a further time interval defined by controller 251 and of sufficient length to enable the dog 139 to be extended and advanced, the cut-off cylinder rod 208 is advanced by a signal from controller 251 to cut-off advance solenoid controller value 146 supplying air to cylinder 137. The advance of rods 208 and 159 is maintained until the separator basket preform 140 is inserted. In the advanced position the preform is compressed across its bond fins 27 and 28 to bow crowns 29 and 31 outward to facilitate entry of mandrel 141 and to retain the preform frictionally in the pucker block 177.

The insertion cycle is repeated. When dial index controller issues a signal that a can and cathode are positioned for reception of a separator basket, the controller 251 responds by issuing an insertion signal. Insertion cylinder 148 extends rod 189 to advance mandrel 141 into the open separator 140 and carry it out of the pucker block, through forming die 228 and into cathode 42 and can 41 in socket 228 on indexing dial 222.

After the bottom of the partially formed separator basket is carried through the preform retainer 179, the mandrel 141 advances it through a forming die 142 and into a cell subassembly comprising hollow cylindrical cathode 42 within can 41. The forming die subassembly 218 and pucker block 177 are combined with preform retainer 179. The die cavity center is positioned coincident with the center line of travel of the mandrel 141 and the separator receiving cavity of cathode 42. In the illustrated application of the inserter station to an indexing turret, battery assembly system as shown in FIGS. 13, 15 an 16, the inserter station base plate 143 is mounted on a stationary tooling dial 221. Spaced below the tooling dial and concentric therewith is an indexing dial or turret 222 containing a series of sockets 223 evenly spaced around the periphery of the indexing dial and adapted to mount cell cans 41 which, at the time they are indexed into registry with the separator insertion station, contain preformed cathode cylinders 42. The preform retainer subassembly 179 is mounted on the underface 224 of the stationary tooling dial 221 and is made up of front and back blocks 225 and 226 hinged together at 227 so they can be opened for servicing the pucker block 177, the preform retainer 179 and the forming die 142.

A back block mounting pad 229 is secured to stationary tooling dial 221 by screws and back block 226 is similarly secured to pad 229. Back block 226 supports pivot pin 231 for bell crank 182, anchor pin for spring 183 and a gudgeon 233 for hinge 227. Front block has integral gudgeons 234 which with pin 235 form hinge 227 and supports pucker block support bracket 232. A latch pin 217 having a pull bail 228 retains front block 225 against back block 226. Each of the front and back blocks contain complementary sockets into which are mounted respective front and rear portions of the forming die 142.

The die 142 contains a main right circular cylindrical cavity which defines the separator basket form for insertion in the underlying cell can and cathode. This cavity is concentric with the forming and insertion mandrel and its axial advance path of travel and of sufficiently greater diameter than the mandrel to pass the basket preform and the folded bond fins 19 and 21 with the mandrel in the preform.

The entry portion of the forming die has generally funnel shaped guide slot portions which are on opposite sides of the cavity to receive the preform bonded side fins 27 and 28. Fins 27 and 28 are carried into the contour of the separator basket wall by tapered guide slots 239 and 241 which are formed with semicircular walls and are offset so that the central plane of each slot is displaced from the central plane of the semicircular half of the die cavity in each of the front and rear die portions 236 and 237. Advantageously each guide slot is similarly offset, in the illustration in a clockwise direction, so that each fin is guided into a clockwise fold along the basket wall.

Withdrawal of forming and insertion mandrel 141 from the inserted preform and cathode cavity is initiated by proximity switch 242 and the response to its signal by controller 251. The retraction solenoid controlled valve 146 for insertion cylinder 148 is energized by the controller to withdraw the mandrel 141. Separator 37 is retained in cathode 42 frictionally as the mandrel is withdrawn.

In summary, magazine fed primary cell separator basket preforms are precisely positioned in a final forming and insertion apparatus by providing the preforms in an elongate and essentially planar strip as a plurality of tandem related preforms with detents in the strip for indexing in the apparatus. The strip, which is flexible is made up of frist and second walls of ionically permeable, flexible, sheet material suitable for battery separators arranged in overlaying relationship, advantageously derived from a longitudinally folded ribbon of the sheet material whereby the fold provides a joint between the first and second walls along one longitudinal margin of the strip and provides the closed bottom of the separator baskets. A bond extending transverse of the strip between the first and second walls for each preform provides a closed sidewall for each separator basket, and preferably is paired with a second similar bond for each preform to provide a closed cylindrical sidewall comprised of portions of the first and second walls. The first and second walls at the longitudinal margins of the preform strip opposite the joint or fold are not joined and can be opened to form the open mouth of a separator basket.

A right circular cylindrical basket preform has its transverse bonds between the overlaying first and second walls extending perpendicular to the folded or joined longitudinal margin of the strip and, in order to provide a closed basket wall, extend continuously from the fold or joint.

While a detent can be provided as a depressed or raised abutment in one or both walls of the strip, advantageously the edge of a sheared portion of a wall has been employed. The sheared edge can be a tooth cut-out in one or both margins of the strip, a punched aperture, or a slit. A component of the edge should be transverse to the longitudinal dimension of the strip. Location of the detent between bond pairs forming each basket avoids any interference by the detent with the basket walls between the bond pairs. A cut or slit edge can be displaced out of the major surface, the general plane, of the strip and when displaced outward from that surface positively defines the index reference position of the strip. A preferred detent is a straight sheared slit intermediate and short of the longitudinal margins of the strip between the trailng bond of a leading preform and the lead bond of a trailing preform and with the trailing edge of the leading preform outstanding from the strip major surface.

Detents are formed in the strip of preforms as the strip is formed as from a ribbon of material. The apparatus providing the preforms can include means to form detents as by an in line shear positioned relative to the preform forming elements to establish a uniform spatial relationship with respective preforms along the strip.

Detents are utilized in feeding preforms in the strip by directing the strip along a guide path which aligns it with the feeding and utilizing apparatus. The strip is engaged with a driving element, a dog in the case of the strip having a detent slit, the driving element is then advanced in the driving direction to engage the detent as by abutting slit edge 129 and then further advanced to drive the strip along the guide path. In the forming and insertion station for separator baskets the guide path is aligned with a cut-off station and intersects a forming and insertion mandrel path of travel so that the side of the strip which is arranged to have separable preform walls is presented to the mandrel. Detents can be positioned behind their associated preforms so that the leading preform of the strip is pushed into the separator basket processing station ahead of the driving element or dog and can be severed from the strip for that processing.

After the severing of the leading preform, its support is provided by an element having a groove, the walls of which embrace a portion of the preform, the lead bond fin 28, and by the advanced drive means and the closed cut-off blade which maintain the preform under compression in the general plane of its surface. This compression also opens the leading basket preform to facilitate insertion of the forming mandrel. Further support of the lead preform during mandrel insertion can be provided at the bottom of the basket or fold region which is the longitudinal margin of the strip opposite the open margin. This support is by means of an element having a surface aligned with the mandrel advance path, spring biased bell crank arm arcuate surface 181. Advance of the mandrel and separator beyond the position in which the mandrel is inserted pushes the support surface 181 aside as the bell crank pivots so that the separator can be carried to the cathode cavity.

It is evident from the above that a number of alternative structures and modes of operation are contemplated as within the scope of this invention, accordingly, it should be understood that this disclosure is to be read as exemplary and not in a restrictive sense.

What is claimed is:

1. An elongate strip of a plurality of preforms for primary cell separator baskets comprising first and second walls of ionically permeable sheet material, said second wall overlaying said first wall; a joint between said first and second walls along one longitudinal margin of said strip; a bond for each of said preforms extending transverse of said strip between said first and second walls; and at least one of said walls having a detent associated with each preform of said strip to facilitate the feed of said strip in processing said preform.

2. A strip according to claim 1 wherein said joint is a longitudinal fold of an elongate ribbon of ionically permeable sheet material and said first and second walls are the longitudinal sides of said ribbon of sheet material; wherein said bonds extend perpendicular to and continuously from said joint to a longitudinal margin of said ribbon of sheet material; and including for each of said preforms a second bond extending perpendicular to and continuously from said joint to a longitudinal margin of said ribbon of sheet material; said detent being located between the first bond of one preform and the second bond of a second preform adjacent said first preform.

3. A strip according to claim 1 wherein said detent is an edge of said sheet material.

4. A strip according to claim 3 wherein said edge is at least in part perpendicular to the length of said strip.

5. A strip according to claim 3 wherein said edge of sheet material is displaced from adjacent major surface of said strip.

6. A strip according to claim 5 wherein said displaced edge is displaced outward from the adjacent major surface of said strip.

7. A strip according to claim 2 wherein said detent is an edge of said sheet material bounding a slit in a wall perpendicular to the longitudinal margin of said ribbon of sheet material.

8. A strip according to claim 2 wherein said detent is an edge of said sheet material bounding a slit in said first and second walls of said ribbon of said strip of preforms.

9. A strip according to claim 8 wherein said edge of said sheet material is intermediate the longitudinal fold and the longitudinal margins of said ribbon and the slit has ends bridged by portions of said ribbon.

10. A strip according to claim 9 wherein said edge of said sheet material is displaced outwardly from the adjacent major surface of said strip.

11. A strip according to claim 10 wherein said strip has a leading preform and a plurality of preforms trailing said leading preform in tandem, said first mentioned bond of each preform is on the leading portion of said preform, said second bond of each preform is on the trailing portion of said preform, and said outwardly displaced edge is on the trailing portion of said preform.

12. The method of forming primary cell separator basket preforms comprising folding longitudinally an elongate ribbon of flexible, ionically permeable, separator material; bonding overlaying sides of the ribbon together normal to the fold and extending continuously from the fold in paired bonds spaced longitudinally of the strip generally one half the perimeter of the separator basket; and forming a detent on a portion of the folded ribbon associated individually with each of the paired bonds whereby a strip of separator preforms is provided with means to precisely index said preforms in subsequent processing.

13. The method according to claim 12 wherein the step of forming a detent is performed on the folded ribbon between bond pairs.

14. The method according to claim 12 wherein the step of forming a detent includes cutting a portion of at least one overlaying side of the ribbon.

15. The method according to claim 14 wherein the step of forming a detent includes shearing the overlaying sides of the ribbon; and displacing one edge of the sheared cut out of the surface of the overlaying side.

16. The method according to claim 15 wherein the step of shearing is performed on the overlaying sides of the ribbon along a line transverse of the length thereof and short of the longitudinal edges of the overlaying sides.

17. The method of feeding a flexible, thin strip of tandem related primary cell separator basket preforms having overlaying walls of ionically permeable sheet material and detents associated with each preform to a processing station comprising; directing a leading portion of the strip along a guide path; engaging the strip with a driving element; and advancing the engaged driving element to engage the detent and advance the strip along the guide path.

18. The method according to claim 17 wherein the driving element is engaged with the strip at the preform following the leading preform of the strip and the advance of the engaged driving element advances the leading preform ahead of the driving element.

19. The method according to claim 18 including the step of inserting the leading portion of the strip into a support element having a groove of a width to receive and embrace the thickness of the strip to support the leading preform.

20. The method according to claim 19 including severing the leading preform from the strip upon its insertion in the groove.

21. The method according to claim 18 including the step of inserting a forming mandrel into the leading preform.

22. The method according to claim 21 including the step of opening the leading basket preform along one longitudinal margin of the strip of preforms to facilitate insertion of the forming mandrel.

23. The method according to claim 22 including the steps of supporting a longitudinal margin of said strip opposite said one margin during insertion of the forming mandrel; and removing the longitudinal margin support as the insertion of the mandrel into the leading preform approaches completion.

24. The method according to claim 23 wherein the mandrel is advanced along a path axially of the mandrel and in a straight line; including the steps of advancing the mandrel along the axial path beyond the location at which the longitudinal margin is supported; and severing the leading preform from the strip prior to the advance of the mandrel beyond the location at which the longitudinal margin is supported.

* * * * *